United States Patent
Kohler

(10) Patent No.: US 11,061,777 B2
(45) Date of Patent: Jul. 13, 2021

(54) METHOD AND PRODUCT FOR IMPLEMENTING APPLICATION CONSISTENT SNAPSHOTS OF A SHARDED RELATIONAL DATABASE ACROSS TWO OR MORE STORAGE CLUSTERS

(71) Applicant: Nutanix, Inc., San Jose, CA (US)

(72) Inventor: Jonathan Michael Kohler, Essex, VT (US)

(73) Assignee: Nutanix, Inc., San Jose, CA (US)

( * ) Notice: Subject to any disclaimer, the term of this patent is extended or adjusted under 35 U.S.C. 154(b) by 305 days.

(21) Appl. No.: 16/049,360

(22) Filed: Jul. 30, 2018

(65) Prior Publication Data
US 2020/0034245 A1    Jan. 30, 2020

(51) Int. Cl.
*G06F 16/23* (2019.01)
*G06F 11/14* (2006.01)
*G06F 9/455* (2018.01)

(52) U.S. Cl.
CPC ...... *G06F 11/1458* (2013.01); *G06F 9/45558* (2013.01); *G06F 16/2365* (2019.01); *G06F 2009/4557* (2013.01); *G06F 2009/45583* (2013.01); *G06F 2009/45591* (2013.01); *G06F 2201/84* (2013.01)

(58) Field of Classification Search
CPC .. G06F 12/0808; G06F 15/173; G06F 15/177; G06F 9/5055; G06F 9/5083; G06F 16/2365; G06F 11/1458; G06F 9/45558; G06F 2009/4557; G06F 2009/45583; G06F 2009/45591; G06F 2201/84
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |
| 10,528,262 B1* | 1/2020 | Shmuylovich ........ G06F 3/0604 |
| 2013/0124475 A1* | 5/2013 | Hildenbrand ....... G06F 16/2315 707/636 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).

(Continued)

*Primary Examiner* — Truong V Vo
(74) *Attorney, Agent, or Firm* — Vista IP Law Group, LLP

(57) ABSTRACT

A method and product for implementing application consistent snapshots of a sharded relational database across multiple storage arrays using a distributed and federated protection domains model across two or more storage clusters.

20 Claims, 10 Drawing Sheets

(56) References Cited

OTHER PUBLICATIONS

Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, I. et al., "Curator: Self-Managing Storage for Enterprise Clusters", 14th USENIX Symposium on Networked Systems Design and Implementation, NSDI '17, (Mar. 27, 2017).

* cited by examiner

METHOD AND PRODUCT FOR IMPLEMENTING APPLICATION CONSISTENT SNAPSHOTS OF A SHARDED RELATIONAL DATABASE ACROSS TWO OR MORE STORAGE CLUSTERS

FIELD

This disclosure relates to the field of implementing application consistent snapshots of a sharded relational database across multiple storage arrays, using a distributed and federated protection domains model across two or more storage clusters.

BACKGROUND

Distributed databases may leverage an architecture in which relational table spaces are spread across multiple databases hereinafter referred to as "data shards". Access to these data shards is controlled by a shard master. The shard master is the entry point to the sharded namespace that stores table definitions, code, and data for non-sharded tables. Any number of shard servers provide scalable storage and data caching for sharded tables, where sharded tables are partitioned across shard servers. Access to the shard servers are transparent to the user, making it appear to the user that they have traditional relational database (DB) access to one massive dataset.

Given the scale out nature of a data sharding mechanism, a relational dataset could be spread across two shards, and be tens of gigabytes (GBs), to hundreds of GBs, and further to dozens of terabytes (TBs). This relational dataset could scale to dozens or even hundreds of shards, where each shard may scale from tens of GBs to dozens of TBs in size. For example, some databases can scale up to 255 shard members. Assuming an average size of 10 TB per shard, wherein 255 shard members at an average 10 TB makes a potential dataset to have a size of ~2.5 petabytes (PBs). An increase in either server-side table space or an increase in shard members within a single shard master namespace would drive the overall relational space to single digit PBs or even double digit PBs. For example, in a world of internet-of-things (TOT) data streaming (and other ever-increasing data needs) this prolific growth in data storage is not out of the question.

Given these numbers of single digit PBs to multi digit PBs scale across a single shard master, data requirements either in space or IO performance may out scale either the capabilities of one single cluster or need to otherwise be partitioned into multiple clusters, to service the entire requirement.

The challenge here becomes backing up this massive dataset with application consistency. Relational databases typically have database level backup utilities. However, these utilities, both in sharded relational databases or in NoSQL type of databases, may not have the ability to perform "shard master" level application consistency snapshots, where particular shards under the management of a shard master must be backed up in an application consistent snapshot. To make matters even worse, in some cases, a single shard may span one or more clusters wherein each cluster may have a different namespace and different cluster management components. Even with clock synchronization, a miscoordination of a nanosecond could miss critical transactions. Given that some of the systems support mission critical, life critical, or financial critical applications, losing transactions is not an option.

Furthermore, certain applications may bypass the shard master completely and communicate directly with some of the shards. In a backup and recovery situation, it is not always practical or possible for the shard master to ensure consistency, especially if the shard master is not on the same cluster. Database vendors have explicitly acknowledged the limitation of backing up application consistent snapshots for sharded databases that span clusters as a problem. Database vendors offering sharding mechanisms have made the requirement for use of sharding only when the database sharding technology is used on one array (e.g., within a single cluster), and not across multiple arrays (e.g., multiple clusters).

Legacy systems have the ability to take application consistent snapshots of datasets when the dataset is stored on a single storage system (e.g., a single cluster). Other legacy systems can maintain consistency across storage systems (e.g., clusters) through mechanisms such as synchronized replication and such. However, no solutions currently exist that has the capacity to coordinate a storage-side snapshot across disparate clusters such that one storage level application snapshot of the entire dataset may be taken, especially when the data is distributed across shards that may span across disparate clusters.

Therefore, there is a need for an approach to solve the aforementioned problems.

SUMMARY

Embodiments of the present invention provide a system, products and methods for implementing application consistent snapshots of a sharded relational database distributed across multiple storage arrays using a distributed and federated protection domains model distributed across two or more storage clusters.

Snapshot coordination may be performed by an elected master backup coordinator such as a federated consistency coordination master coordinator (FCC-MC). The FCC-MC directs multiple storage systems to perform at least storage array side snapshots in a simultaneous and coordinated fashion with respect to other storage arrays within the federation. "storage systems" and "storage arrays" may hereinafter be referred to as "clusters." Conceptually similar to a master process within a single array, the FCC-MC has the additional responsibility of coordinating across multiple arrays (e.g., multiple clusters).

In one embodiment, a computer-implemented method for generating application consistent snapshots of data shards distributed across a plurality of storage clusters includes identifying a plurality of virtual machines, a shard master, and two or more data shards distributed on a plurality of storage clusters in a virtualization environment. The method also includes forming a federated consistency coordination protection domain (FCC-PD), the FCC-PD comprising: a group of virtual machines chosen from the plurality of virtual machines identified, and a group of data shards associated to the group of virtual machines chosen, the FCC-PD distributed across the plurality of storage clusters. Additionally, the method includes generating an application consistent snapshot of the FCC-PD.

In one or more embodiments, the FCC-PD is a defined group of virtual machines that are backed up together, the group of virtual machines executing across the plurality of storage clusters.

In one or more embodiments, generating the application consistent snapshots of the FCC-PD includes electing a master backup coordinator that coordinates the application consistent snapshot; issuing, by the master backup coordinator, a backup control call to slave backup coordinators in the FCC-PD; receiving a confirmation of successful freeze of data shards associated to the group of virtual machines from the slave backup coordinators; issuing, by the master backup coordinator, a control call to perform a storage cluster level snapshot of respective objects for entities with a local domain of the slave backup coordinators; and issuing, by the master backup coordinator, a thaw control call to the slave backup coordinators to unfreeze the data shards after the master backup coordinator receives confirmation of successful completion of the application consistent snapshot from the slave backup coordinators within the FCC-PD.

In one or more embodiments, the master backup coordinator is executed by a controller virtual machine. The master backup coordinator is executed as a light weight process. The master backup coordinator is a slave backup coordinator for its corresponding cluster. As soon as a single shard within the local domain of the slave backup coordinator is frozen, the slave backup coordinator begins processing a snapshot of the shard that is frozen.

In one or more embodiments, a virtual machine corresponding to the single shard is not thawed once the snapshot of the single shard is completed. Generating the application consistent snapshot of the FCC-PD is for a multi-array crash consistency. The application consistent snapshot is application consistent at a namespace level.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION OF THE EMBODIMENTS OF THE INVENTION

Figure 1:
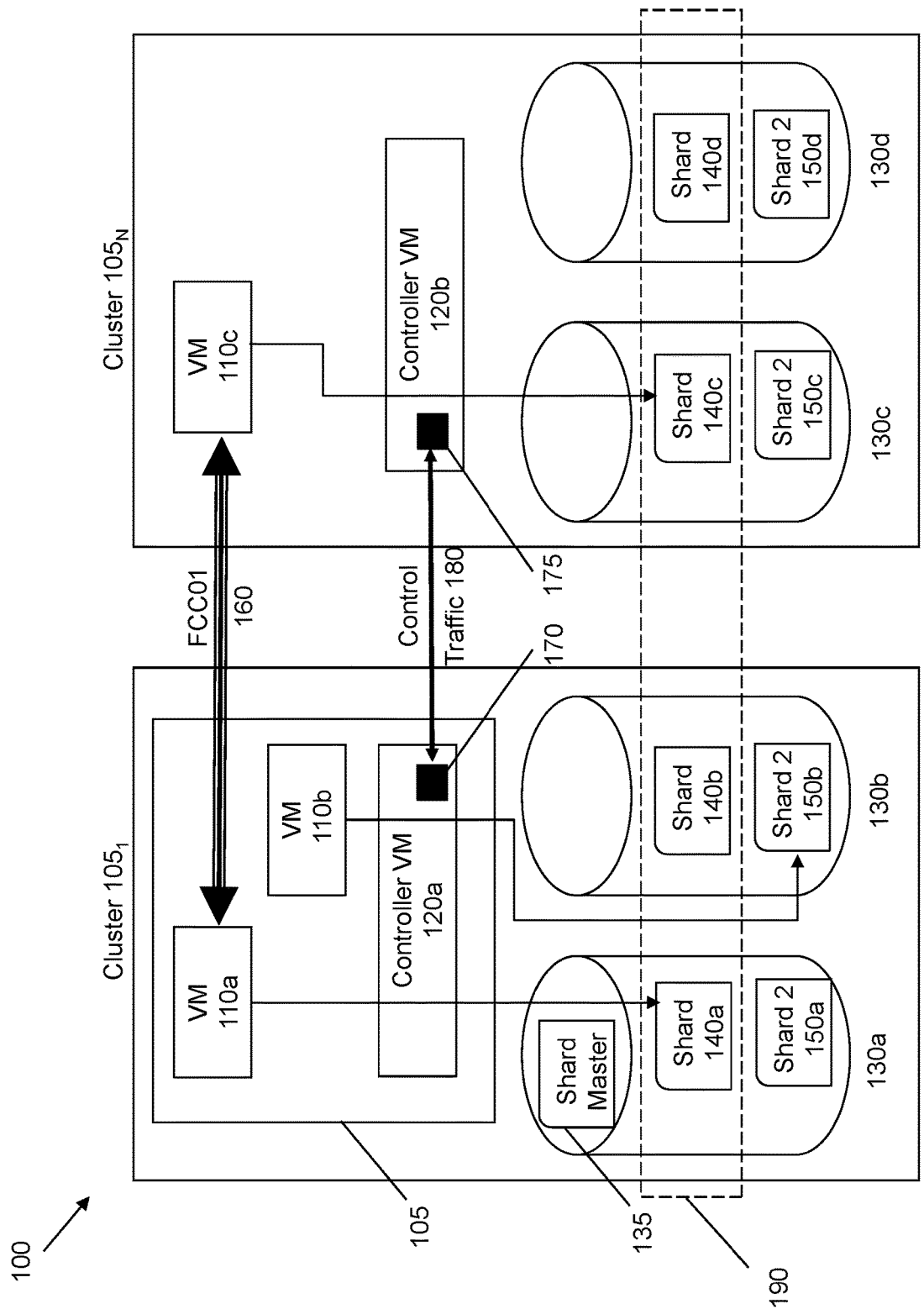
FIG. 1 illustrates an example architecture in which some embodiments of the disclosure are implemented.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Embodiments of the present disclosure provide an approach to implement application consistent snapshots of a sharded relational database distributed across multiple storage systems, hereinafter may be referred to as "clusters." The application consistent snapshot of the sharded relational database that spans across multiple clusters may be organized in a federated consistency coordination protection domain. A protection domain is a defined group of virtual machines to be backed up locally on a cluster.

A federated consistency coordination protection domain (FCC-PD) is a "spanned" protection domain where a master backup coordinator coordinates snapshots with, as an example, database online backup calls across multiple disparate clusters to guarantee an application consistent snapshot across the disparate clusters of datasets corresponding to the defined group of virtual machines to be backed up together, wherein the term "federated" means to form or be formed into a single centralized unit. Therefore, a federated consistency coordination protection domain is a plurality of virtual machines with corresponding shards distributed across one or more storage clusters that are grouped together into a single unit such that the single unit may be backed up via an application consistent snapshot.

A storage cluster is a group of storage servers that act like a single storage system that enables high availability and, in some cases, load balancing and parallel processing. In many embodiments, a storage cluster may include a plurality of processing nodes and storage devices working as a single storage system in a virtualization environment. In many embodiments, the virtualization environment may include a plurality of storage clusters spanned across geographical locations. In some embodiments, each storage cluster may include its own respective namespace such that different storage clusters may each include different namespaces. In some embodiments, data shards may be distributed amongst a plurality of servers within a particular cluster. In some embodiments, the data shards may be distributed amongst a plurality of clusters as well.

The present disclosure provides a coordination mechanism that includes the master backup coordinator to coordinate the application consistent snapshots of the sharded relational database within the FCC-PD that spans across multiple clusters. The master backup coordinator communicates with slave backup coordinator(s) at each of the clusters to coordinate the application consistent snapshots across the FCC-PD.

Upon receiving a request to take an application consistent snapshot of a dataset stored in one or more shards within an FCC-PD that spans across multiple clusters of a storage architecture, a master backup coordinator may be elected to coordinate the implementation of the snapshots. The master backup coordinator may initiate a freeze call to all slave backup coordinators to freeze and seize all write operations into their respective local shards within the FCC-PD. Once the master backup coordinator receives acknowledgement from each of the slave backup coordinators of the successful freezing of their respective shards, the master backup coordinator instructs each of the slave backup coordinators to take the snapshot of the respective shards within its respective cluster. Once the master backup coordinator receives successful acknowledgements from all slave backup coordinators that all snapshots are successfully completed, the master backup coordinator issues a thaw command to resume normal operations on all of the previously frozen shards across the FCC-PD.

It is the coordination between the master backup coordinator and the slave coordinators within the FCC-PD that guarantees the snapshots created by each of the backup slave coordinators, collectively, are an application consistent snapshot of the sharded relational database that spans across multiple storage clusters of the FCC-PD.

For example, assuming an FCC-PD includes a dataset that is stored on shards that span across 10 clusters. During an application consistent backup, for some reason, only 9 out of 10 clusters in the federated consistency group successfully froze I/O operation within their respective shards, and the $10^{th}$ cluster failed to do so after a configurable timeout period expires. The master backup coordinator would not issue instructions for the backup slave coordinators to take their relative snapshots. Instead, the master backup coordinator would issue a "thaw" instruction to have the 9 other clusters resume normal operations such that, the application consistent snapshot is canceled so that it may be performed at a later period of time. Perhaps after the issues that plagued the $10^{th}$ cluster from successfully freezing its local shards within the timeout period.

However, assuming all 10 clusters within the federated consistency group successfully acknowledged the completion of the freezing of the shards, then the master backup coordinator would instruct the slave backup coordinators to take the snapshots of the shards within its coordination domain local (CD-local).

In some embodiments, optimization features may be included in the process to further improve the efficiencies of the coordinated application consistent snapshot. For example, one optimization feature may include the slave backup coordinator taking snapshots of the shards within its CD-local as soon as the slave backup coordinator successfully completes its freeze operations. This way, as soon as the master backup coordinator initiates the instructions for all slave backup coordinators to take the snapshot (thereby implicitly acknowledging that all slave backup coordinators have successfully completed the freeze operations), the slave backup coordinator would simply mark the taken snapshots as a "good" snapshot and send confirmation to the master backup coordinator of the completion of the snapshot.

FIG. 1 shows an example architecture in which some embodiments of the disclosure are implemented. System 100 is a virtualization environment that comprises at least two clusters—cluster $105_1$ and cluster $105_N$, where N can be any number 2 or greater corresponding to a number of clusters in system 100.

Cluster $105_1$ may include node(s) 105, one or more databases 130a and 130b, shard master 135, data shard 140a, data shard 140b, data shard 150a, data shard 150b, and a federated consistency coordination master backup coordinator (FCC-MC) 170.

In this particular example, cluster $105_1$ is depicted as having only one node 105 for simplicity of explanation. Cluster $105_1$, during normal operation, may have one or more node(s) 105. Node 105 may include one or more user virtual machines (VMs) 110, and a controller virtual machine (CVM) 120a. VM 110a may have an application App 1 (not shown) executing on VM 110a. VM 110b may have another application App 2 (not shown) executing on VM 110b. App 1 may access its dataset from data shard 140a stored in database 130a. App 2 may access its respective dataset from a different data shard 150b stored in database 130b. Both VM 110a and VM 110b access their respective datasets via controller VM (CVM) 120a. CVM 120 is disclosed in more details below.

Sharding is a type of database partitioning that separates very large databases the into smaller, faster, more easily managed parts called data shards. The word shard means a small part of a whole. In the simplest sense, sharding a database involves breaking up a big database into many, much smaller databases that share nothing and can be spread across multiple servers. Technically, sharding is synonymous with horizontal partitioning. Sharding is often used to refer to any database partitioning that is meant to make a very large database more manageable. The governing concept behind sharding is based on the idea that as the size of a database and the number of transactions per unit of time made on the database increase linearly, the response time for querying the database increases exponentially.

Additionally, the costs of creating and maintaining a very large database in one place can increase exponentially because the database will require high-end computers. In contrast, data shards can be distributed across a number of much less expensive commodity servers. Data shards generally have comparatively little restriction as far as hardware and software requirements are concerned. In some cases, database sharding can be done fairly simply. One common example is splitting a customer database geographically. Customers located on the East Coast can be placed on one server, while customers on the West Coast can be placed on a second server. Assuming there are no customers with multiple locations, the split is easy to maintain and build rules around.

Cluster $105_N$ includes a node (not shown), VM 110c, a CVM 120b, one or more storage devices 130c and 130d, data shard 140c, data shard 140d, data shard 150c, data shard 150d, and a federated consistency coordination slave backup coordinator (FCC-SC) 175. VM 110c may have an application App 1 (not shown) executing on VM 110c. App 1 may access its dataset from data shard 140c stored in database 130c. VM 110c accesses its datasets via controller VM (CVM) 120b. CVM 120 is disclosed in more details below.

System 100 also includes a federated consistency coordination protection domain 01, hereinafter referred to as "FCC01 160". FCC01 160, in the present embodiment, is a federated consistency coordination protection domain that is formed identifying VM 110a and VM 110c as a group of VMs to be backed up locally within their respective clusters, which includes snapshots of their associated data shards 140a and 140c, respectively. Other VMs, not depicted in FIG. 1, may also include applications that access the shards 140 that are members of FCC01.

FCC-MC 170 is a master backup coordinator that coordinates storage array side snapshots in a simultaneous fashion across multiple clusters while maintaining the business logic state of the operation. Conceptually similar to a master process within a single array with the exception that the master backup coordinator has the responsibility of coordinating with multiple arrays (e.g., multiple clusters). The FCC-MC 170 is depicted as executing within the controller VM 120a. In other embodiments, the FCC-MC 170 may execute as a separate third-party service such as, for example, a light weight process, instead of operating within the CVM 120. The FCC-MC 170 is elected at the start of the backup process. For example, during a backup operation, an FCC-MC 170 is elected from the multiple clusters to coordinate the coordinated backup operation across the federated consistency coordination protection domain. In the present embodiment, the elected FCC-MC 170 is executing within the CVM 120a on cluster 1 to coordinate the application consistency snapshot across FCC01 160. The election of the FCC-MC 170 may be based on server utilization rates, available server resources such as CPU, memory, etc, or proximity to the entity requesting the coordinated backup/snapshot of the FCC01.

FCC-MC 170 communicates with FCC-SC(s) 175 from other clusters within the FCC01 160 to coordinate the backups/snapshots. FCC-MC 170 may communicate with respective FCC-SC(s) 175 via a software layer that allows user VM(s) 110 to communicate with controller VM(s) 120 and allows the controller VM(s) 120 to communicate with other controller VM(s) 120 within in the entire virtualization environment via control traffic 180. The software layer is installed on all shard systems to provide communication within the local cluster and external clusters for control traffic.

Shard group 180 includes shards 140 because shards 140 are shards associated with respective VMs defined within the FCC01 to be included in the application consistent snapshots. When an application consistent snapshot is taken for VMs of FCC01 160, the coordinated application consistent snapshot will be of shard group 180, which comprises shards 140 associated to VMs 110a and 110c.

Figure 2:
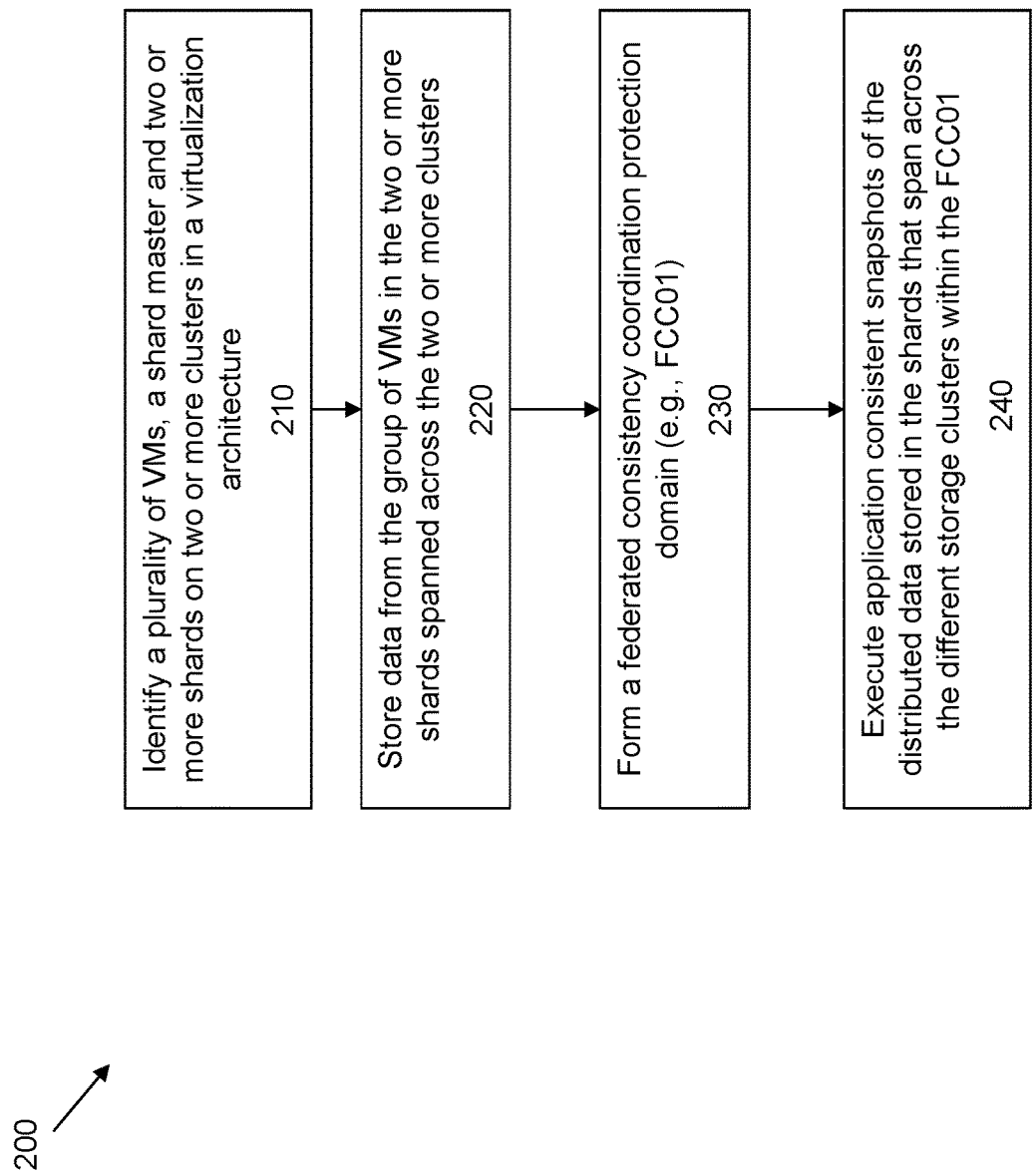
FIG. 2 illustrates a high-level flowchart for implementing some embodiments of the present disclosure.

FIG. 2 illustrates a high-level flowchart for implementing some embodiments of the present disclosure. Method 200 is a computer-implemented method for generating application consistent snapshots of data shards distributed across a plurality of storage clusters. At 210, a plurality of virtual machines (VMs), a shard master, and two or more data shards distributed on a plurality of storage clusters in a virtualization architecture are identified. A portion of the plurality of VMs may operate in a first cluster while another portion of the plurality of VMs may operate in a different cluster in the virtualization environment. The VMs may access data shards that may be distributed across their respective cluster and/or distributed across other clusters in the virtualization environment. The shard master is the entry point to the sharded namespace, and stores table definitions, code, and data for non-sharded tables, as discussed above. The two or more data shards may correspond to data shards distributed and partitioned across servers within a cluster and/or distributed across other clusters. In some embodiments, the plurality of storage clusters comprises disparate storage clusters. Yet even in some other embodiments, storage systems within a single cluster may include disparate databases.

At 220, datasets associated to the plurality of VMs are stored and accessed in the two or more data shards that are distributed and/or partitioned across the two or more clusters. The datasets corresponding to transactional data and/or metadata associated with normal operations of applications running on the plurality of VMs identified. Similar to data being stored into distributed database tables within a cluster, the datasets associated to the plurality of VMs are stored in the two or more data shards that may be distributed within a storage cluster and/or distributed across the plurality of storage clusters in the virtualization environment. In some embodiments, the data shards may be stored on disparate storage systems.

At 230, a federated consistency coordination protection domain (e.g., FCC01) is formed. The FCC01 comprises a group of VMs chosen from the plurality of VMs identified, and at least a group of data shards storing data associated to the group of VMs chosen. A first portion of the VMs from the group of VMs chosen to be included in FCC01 may operate in a first cluster while a second portion of the group of VMs chosen may operate in a second cluster. Similarly, a first portion of the data shards from the group of data shards may operate in a first cluster for handling I/O requests for the first portion of VMs. A second portion of the data shards from the group of data shards may operate in a second cluster for handling I/O requests for the second portion of VMs. In some embodiments, the entire group of VMs chosen and the entire group of data shards associated to the entire group of VMs chosen may all operate within a single cluster. In other embodiments, the entire group of VMs chosen may be associated with a group of data shards distributed across a plurality of storage clusters.

At 240, application consistent snapshots of the datasets stored on the two or more data shards within the FCC01 are executed. Execution of the application consistent snapshots require a coordinated effort to guarantee an application consistent snapshot of one or more datasets in the FCC01 is generated, especially with the FCC01 comprising data shards that are distributed and/or partitioned across a one or more clusters. More details of how the application consistent snapshot is guaranteed is discussed below in FIGS. 4 and 5.

Figure 3:
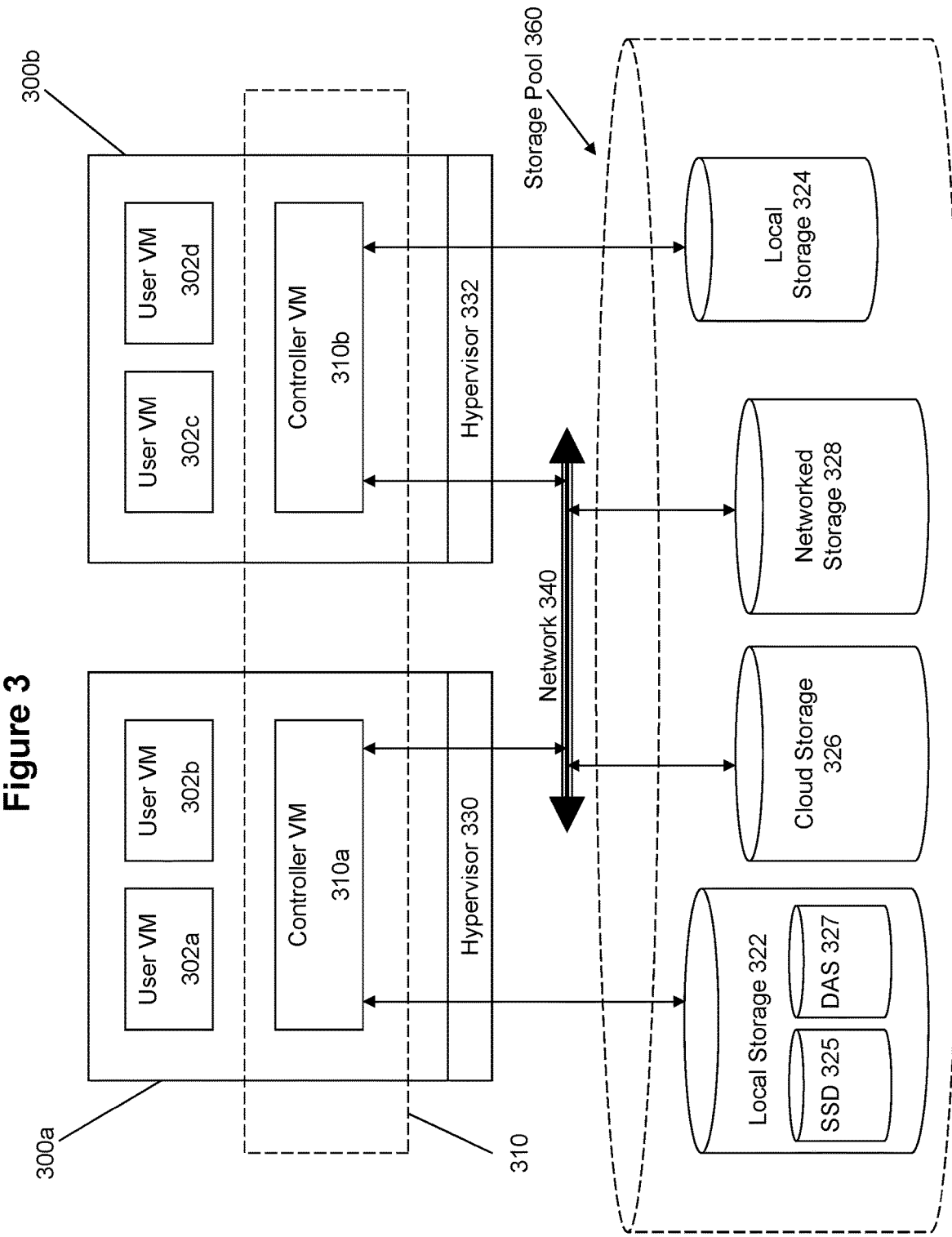
FIG. 3 illustrates an example architecture in which some embodiments of the disclosure are implemented.

FIG. 3 illustrates an example architecture in which some embodiments of the disclosure are implemented. The architecture of FIG. 3 can be implemented for a distributed platform that contains multiple nodes/servers 300a and 300b that manages multiple-tiers of storage. The nodes 300a and 300b may be within the same block, or on different blocks in a clustered environment of multiple blocks. The multiple tiers of storage include storage that is accessible through a network 340, such as cloud storage 326 or networked storage 328 (e.g., a SAN or "storage area network"). In addition, the present embodiment also permits local storage 322/324 that is within or directly attached to the server and/or appliance to be managed as part of the storage pool 360. As noted above, examples of such storage include any combination of SSDs 325 and/or HDDs 327. These collected storage devices, both local and networked, form a storage pool 360.

Virtual disks (or "vDisks") can be structured from the storage devices in the storage pool 360, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM. Each server 300a or 300b runs virtualization software, such as VMware ESX(i), Microsoft Hyper-V, or RedHat KVM. The virtualization software includes a hypervisor 330/332 to manage the interactions between the underlying hardware and the one or more user VMs 302a, 302b, 302c, and 302d that run client software.

Controller VM 310a/310b (also referred to herein as "service VMs") are used to manage storage and I/O activities. This is the distributed "Storage Controller" in the currently described architecture. Multiple such storage controllers coordinate within a cluster to form a single-system. The Controller VMs 310a/310b are not formed as part of specific implementations of hypervisors 330/332. Instead, the Controller VMs run as virtual machines above hypervisors 330/332 on the various nodes/servers 302a and 302b, and work together to form a distributed system 310 that manages all the storage resources, including the locally attached storage 322/324, the networked storage 328, and the cloud storage 326. Since the Controller VMs run above the hypervisors 330/332, this means that the current approach can be used and implemented within any virtual machine architecture, since the Controller VMs of embodiments of the invention can be used in conjunction with any hypervisor from any virtualization vendor.

Each Controller VM 310a-b exports one or more block devices or NFS server targets that appear as disks to the client VMs 302a-d. These disks are virtual, since they are implemented by the software running inside the Controller VMs 310a-b. Thus, to the user VMs 302a-d, the Controller VMs 310a-b appear to be exporting a clustered storage appliance that contains some disks. All user data (including the operating system) in the client VMs 302a-d resides on these virtual disks.

Significant performance advantages can be gained by allowing the virtualization system to access and utilize local (e.g., server-internal) storage 322 as disclosed herein. This is because I/O performance is typically much faster when performing access to local storage 322 as compared to performing access to networked storage 328 across a network 340. This faster performance for locally attached storage 322 can be increased even further by using certain types of optimized local storage devices, such as SSDs 325. Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 322. On the other hand, data that does not require fast access or which is accessed infrequently can be stored in the networked storage devices 328 or in cloud storage 326. In addition, the performance of the local storage can be further improved by changing the mix of SSDs and HDDs within the local storage, e.g., by increasing or decreasing the proportion of SSDs to HDDs in the local storage.

The present architecture solves storage challenges for virtual machines providing a general-purpose scale-out compute and storage infrastructure that eliminates the need for network storage. In part, this is due to the distributed nature of the storage controller infrastructure that utilizes controller VMs to act as a virtual controller for SOCS. Since all the Controller VMs in the cluster communicate with each other to form a single distributed system, this eliminates the limitations and performance bottlenecks associated with traditional SAN solutions that typically have only 1, 2, 4 or 8 controllers. Therefore, n-node clusters will essentially have n controllers, providing a solution that will easily scale to very large data volumes.

In addition, the solution will very effectively support virtualization and hypervisor functions, within a single virtualization appliance (block) that can be extensively combined with other blocks to support large scale virtualization needs. Since the architecture is VM-aware, it overcomes limitations of traditional solutions that were optimized to work only with physical servers. For example, the present approach overcomes limitations associated with the traditional unit of management for storage pertaining to LUNs, where if a LUN is shared by many VMs, it becomes more difficult to perform storage operations such as backup, recovery, and snapshots on a per-VM basis. It is also difficult to identify performance bottlenecks in a heavily-shared environment due to the chasm between computing and storage tiers. The current architecture overcomes these limitations since the storage units (vdisks) are managed across an entire virtual storage space.

Moreover, the present approach can effectively take advantage of enterprise-grade solid-state drives (SSDs). Traditional storage systems were designed for spinning media and it is therefore difficult for these traditional systems to leverage SSDs efficiently due to the entirely different access patterns that SSDs provide. While hard disks have to deal with the rotation and seek latencies, SSDs do not have such mechanical limitations. This difference between the two media requires the software to be optimized differently for performance. One cannot simply take software written for hard disk-based systems and hope to use it efficiently on solid-state drives. The present architecture can use any type of storage media, including SSDs, and can use SSDs to store a variety of frequently-accessed data, from VM metadata to primary data storage, both in a distributed cache for high-performance and in persistent storage for quick retrieval.

In some embodiment, to maximize the performance benefits of using SSDs, the present architecture reserves SSDs for I/O-intensive functions and includes space-saving techniques that allow large amounts of logical data to be stored in a small physical space. In addition, the present approach can be used to migrate "cold" or infrequently-used data to hard disk drives automatically, allowing administrators to bypass SSDs for low-priority VMs.

The present architecture therefore provides a solution that enables significant convergence of the storage components of the system with the compute components, allowing VMs and SOCS to co-exist within the same cluster (e.g., cluster $105_1$). From a hardware perspective, each block provides a "building block" to implement an expandable unit of virtualization, which is both self-contained and expandable to provide a solution for any sized requirements.

Figure 4:
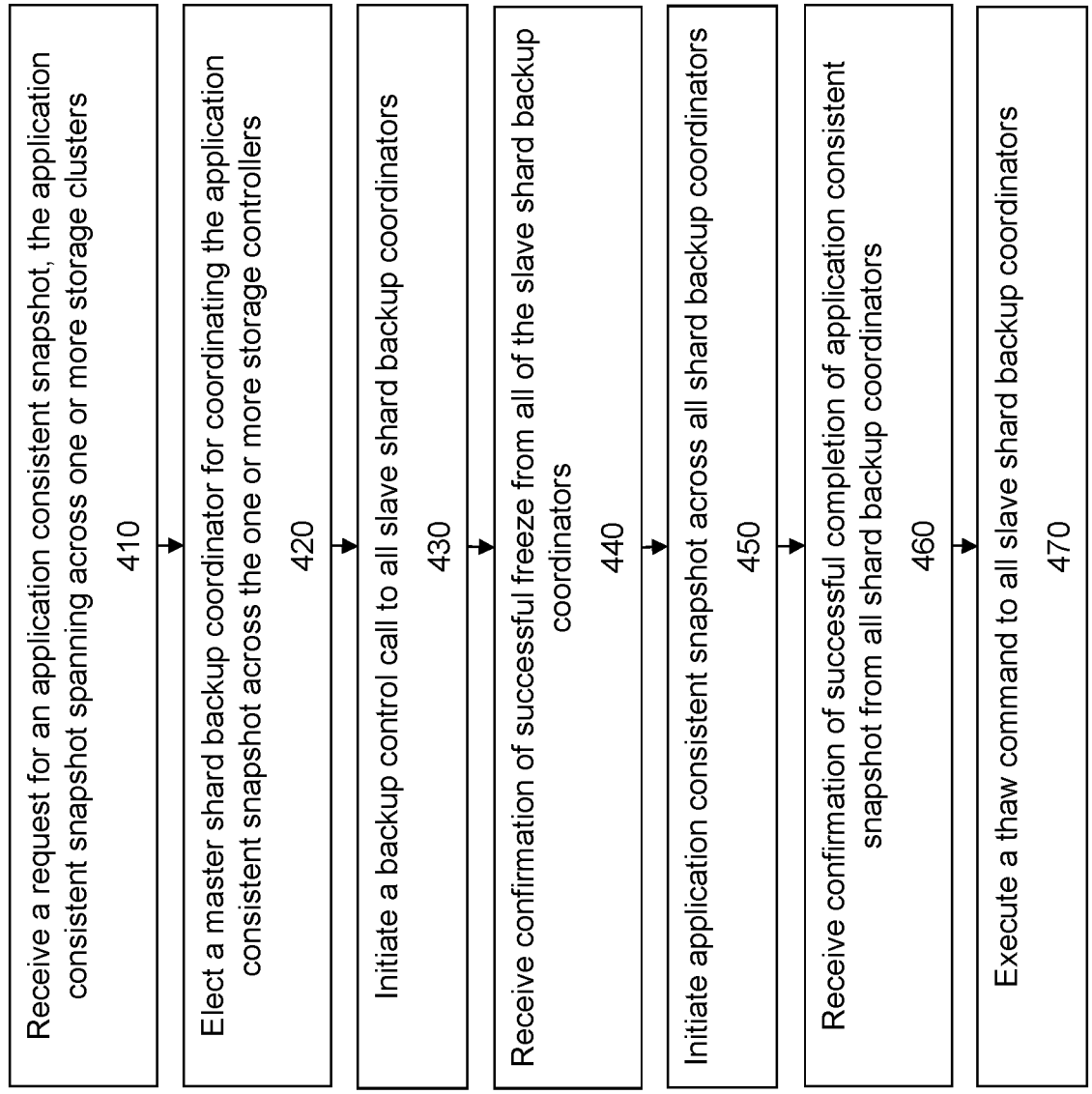
FIG. 4 illustrates a flowchart for coordinating an application consistent snapshot of sharded relational database across multiple storage systems, according to some embodiments of the present disclosure.

FIG. 4 illustrates a flowchart for coordinating an application consistent snapshot of sharded relational database across multiple clusters/storage systems, according to some embodiments of the present disclosure. At 410, a request for an application consistent snapshot for a federated consistency coordination protection domain (e.g., FCC01 160) is received. The application consistent snapshot comprises snapshots of data shards distributed across one or more clusters in a virtualization environment. The request may be for a namespace level consistency, and/or a shard master level application consistency (e.g., guaranteed PB level application consistency across all shards in the namespace). In some embodiments, the request may be originated from an application.

At 420, a master backup coordinator (FCC-MC) is elected for coordinating the application consistent snapshot by coordinating with one or more slave backup coordinators (e.g., FCC-SC 175). Each cluster has at least 1 slave backup coordinator (FCC-SC) communicating with the FCC-MC for handling the application consistent snapshot on its respective coordination domain local (CD-local). As discussed above, the FCC-MC may execute as a module within a controller VM. In other embodiments, the FCC-MC may be executed as a separate stand alone third-party module on, for example, a light weight process that may be deployed on any computing server that may be communicatively coupled to the virtualization environment. In some embodiments, the master backup coordinator may communicate with the shard master to retrieve shard information corresponding to the one or more shards that spans across the plurality of storage clusters. The one or more shards being included within the FCC-PD (e.g., FCC01).

At 430, the FCC-MC issues a backup control call to FCC-SC(s) within the FCC-PD (e.g., FCC01 160). Since the FCC-SC(s) are on each of their own respective cluster, the FCC-MC may also function as the FCC-SC for its corresponding cluster. For example, referring to FIG. 1, FCC-MC 170 may also perform the functions of an FCC-SC for cluster 1 since cluster 1 was designated as the master for handling the application consistent snapshot request. Therefore, although FCC-MC 170 is the master backup controller for FCC01 160, FCC-MC 170 may also function as a cluster 1's FCC-SC in performing the actual backup operations. The FCC-SC 175 may issue an application call to freeze all shards within its coordination local domain (CD-local). In some embodiments, no application calls will be made. Instead, IO would be paused on all entities in FCC01, and a snapshot will be taken once all entities have successfully paused.

At 440, the FCC-MC receives confirmation from each of the FCC-SCs of completion of freeze operations across all entities of the FCC-PD within their CD-local, which is just the local entities of, as an example, FCC01 on their entire cluster (could span many nodes). This is an important step because in order to guarantee the application snapshot is consistent across the plurality of clusters, all snapshot must be taken at a point in time that is marked for the plurality of clusters. This is because in disparate clusters where the dataset is not replicated from one cluster to another, but instead, the dataset is independently managed by each cluster, it is nearly impossible to ensure all snapshots are consistent per a particular time T0. Therefore, instead of relying on an exact time T0 for taking snapshots of the many shards that span across clusters, grouping all snapshots of the many shards within a particular transaction/coordinated snapshot guarantees that the application snapshot is consistent. For example, if not all of the clusters report back to the FCC-MC that they were successful in the freeze, the FCC-MC would issue a "thaw" control call so that the other FCC-SC may release their freeze on their shards and the FCC-MC would have to coordinate another application consistent snapshot at a later time when all FCC-SC can report a successful freeze.

Once the FCC-MC receives successful replies from all FCC-SC(s), at 450, the FCC-MC issues an additional control request to the FCC-SC(s) to perform a storage array side snapshot for all respective objects (e.g., oplog, egroups, vdisks, etc.) that are normally included within a snapshot for all entities within the CD-local, and then return status. As discussed above, once all FCC-SC(s) report successful freeze, now it's guaranteed that the snapshots taken by each of the FCC-SC(s) are consistent with respect to the current application consistent snapshot.

At 460, the FCC-MC receives confirmation of successful completion of application consistent snapshots from all FCC-SC(s). This indicates that the application consistent snapshot across the FCC-PD is successful.

At 470, the FCC-MC issues a control call to the FCC-SC(s) to "thaw" their respective entities to resume normal operations since the application consistent snapshot of the FCC-PD is successful. Alternatively, if the backup was not successful (e.g., not all freeze operations were successful or not all snapshot executions were successful), the FCC-MC would still issue a "thaw" control call to all FCC-SC(s) to release their freeze and return to normal operations to minimize system downtime. Upon an unsuccessful backup attempt, in some embodiments, the FCC-MC may start the process again by reissuing a "backup" control call to start the process again at a later time.

Figure 5:
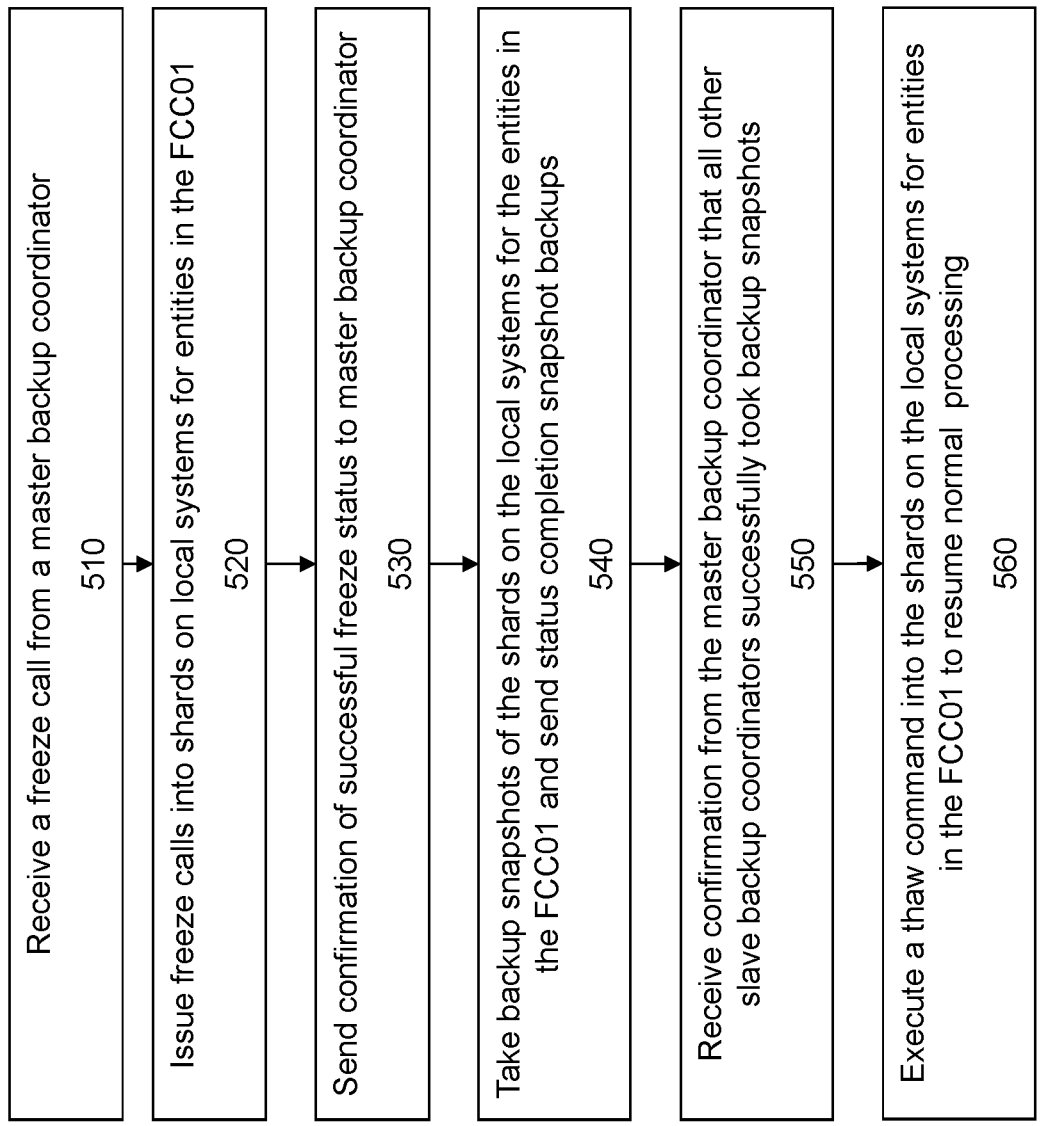
FIG. 5 illustrates a flowchart for implementing an application consistent snapshot by a slave backup coordinator, according to some embodiments of the present disclosure.

FIG. 5 illustrates a flowchart for implementing an application consistent snapshot by a slave backup coordinator, according to some embodiments of the present disclosure. At 510, the FCC-SC receives a "backup" control call (e.g., from step 430 of FIG. 4) to start the backup process. At 520, the FCC-SC(s) issue a "freeze" call into the shards on their local systems for all entities in their FCC-PD (e.g., FCC01). As each shard freezes, all caches are flushed to disk.

Additional shard activity may occur within the namespace; however, a global snapshot of the namespace will NOT occur until all shard members are frozen successfully within the namespace. Once the freeze completes, no more writes are accepted per shard. At 530, a "successful freeze" call is returned via, as an example, the software layer to the FCC-MC once all freeze for all entities within the FCC-PD of the local cluster are completed.

At 540, from a distributed processing perspective, complementary technology already available may be leveraged to take backup snapshots of the shards on the local cluster for the entities in the FCC-PD before receiving the control call from the FCC-MC to take the backup snapshots. For example, as soon as a single shard is successful frozen, an oplog marker from NearSync is notated and begins processing the snapshot for the shard. Unlike traditional snapshot processing where the VM would be told to thaw and continue processing as soon as the snapshot of its corresponding shard is completed, the shard would remain in a frozen stage until a future step (e.g., until the FCC-MC issues the "thaw" control call to the FCC-SC or a timeout threshold has been exceeded which indicates a failed global backup). Taking the marker and beginning processing allows the cluster to distribute the work of generating the snapshot. However, the snapshot would only have a status of "validated good" once global activities of all other FCC-SC(s) are successfully completed. For failed global activities, the "semi processed" snapshot would be marked dirty and discarded by, as an example, a garbage collection process.

The FCC-SC(s) would report the competition of these snapshot activities as they occur to the FCC-MC for each entity. As there could be many entities, it may take some time to report all of the entities. The FCC-SC then reports the completion of snapshots taken across ALL entities within FCC within their coordination domain local (CD-local), which is just the local entities of FCC01 on their entire cluster (could span many nodes).

The FCC-SC would then enter a standby/waiting mode (with some sort of timeout value set via, as an example, a GFLAG) to wait for additional control traffic. While in standby/waiting mode, all shards are frozen and therefore not accepting any new writes and are application consistent at both a shard level AND cluster level, but NOT a namespace level. Once the FCC-MC receives successful replies from all FCC-SC(s), the FCC-MC issues an additional control request to perform a storage array side snapshot for all respective objects (e.g., oplog, egroups, vdisks, etc.) that are normally performed with a snapshot for all entities within the CD-local with a request for a return status.

Once the FCC-MC receives success status from all FCC-SC(s) for the storage array side snapshot for all respective objects, at 550, the FCC-SC(s) receives confirmation from the FCC-MC that all other FCC-SC(s) successfully took backup snapshots, thus the resulting federated snapshot will be application consistent at a namespace level and will be marked "good."

The FCC-SC receives a "thaw" control call from the FCC-MC. At 560, the FCC-SC executes a thaw command to their CD-local. As each shard is thawed, data service for the partitions on that shard will be restored within the namespace. Eventually, all shards will be thawed, and full namespace functionality is restored. The resulting "good" snapshot could be used for restore operations, or as an "object" to be backed up via a backup API (e.g. CVLT, Comtrade, etc.). Embodiments of the present disclosure would especially be useful for "non-production" data demotion use cases, where a user may need access to 1 PB of data for upgrade testing, bug validation, or other functional use cases where production data cannot be touched.

In another embodiment, where the request for an application consistent snapshot is required for an approximate coverage such as a multi-array crash consistency. This embodiment is largely similar to the processing steps of FIGS. 4 & 5 disclosed above, with the exception that no application calls are made. Instead, IO would be paused on all entities in the FCC01, and a snapshot will be taken once all entities have successfully paused. This also means that the distributed marker approach is invalid. Instead, IO marking would only be able to occur once IO has paused everywhere, such that markers would all be taken from the same "state" of the application. From a recovery perspective, application would be recovered using the traditional "crash consistent" recovery methodology, which usually involve replaying transactions and running database consistency checks. This present embodiment offers additional protection that the application would not have otherwise, and in some situations be actually preferred (even in non-big data situations). The preference could be valid for datasets that do not have the ability to have application consistency (e.g., no facility for application flushing) and just need crash consistency BUT happen to live on multiple arrays.

This present embodiment could also play into a "floating pool" of resources approach where a VM is a part of a self-service portal (SSP) tenant is provisioned across multiple PE's from PC, and then the user requests consistency across the two VMs which happen to not be local to each other. For example, a business may be provisioning resources into a self-service portal (SSP), where the business may have zero knowledge of the underlying topology. Behind the scenes, the storage resources may be set up on multiple shards within their "environment," which may or may not be configured on a same cluster. Given that the business might not know where their resources are provisioned, the business have zero way of telling whether the shards are on the same storage system (e.g., cluster) or not. This is also common in the cloud computing world where, for example, a user may be provisioning hardware and software resources into a region or availability zone, which are "non-physical" constraints provided by the cloud provider. Within the non-physical constraints, there may be multiple storage domains that the user would not be aware of.

Figure 6:
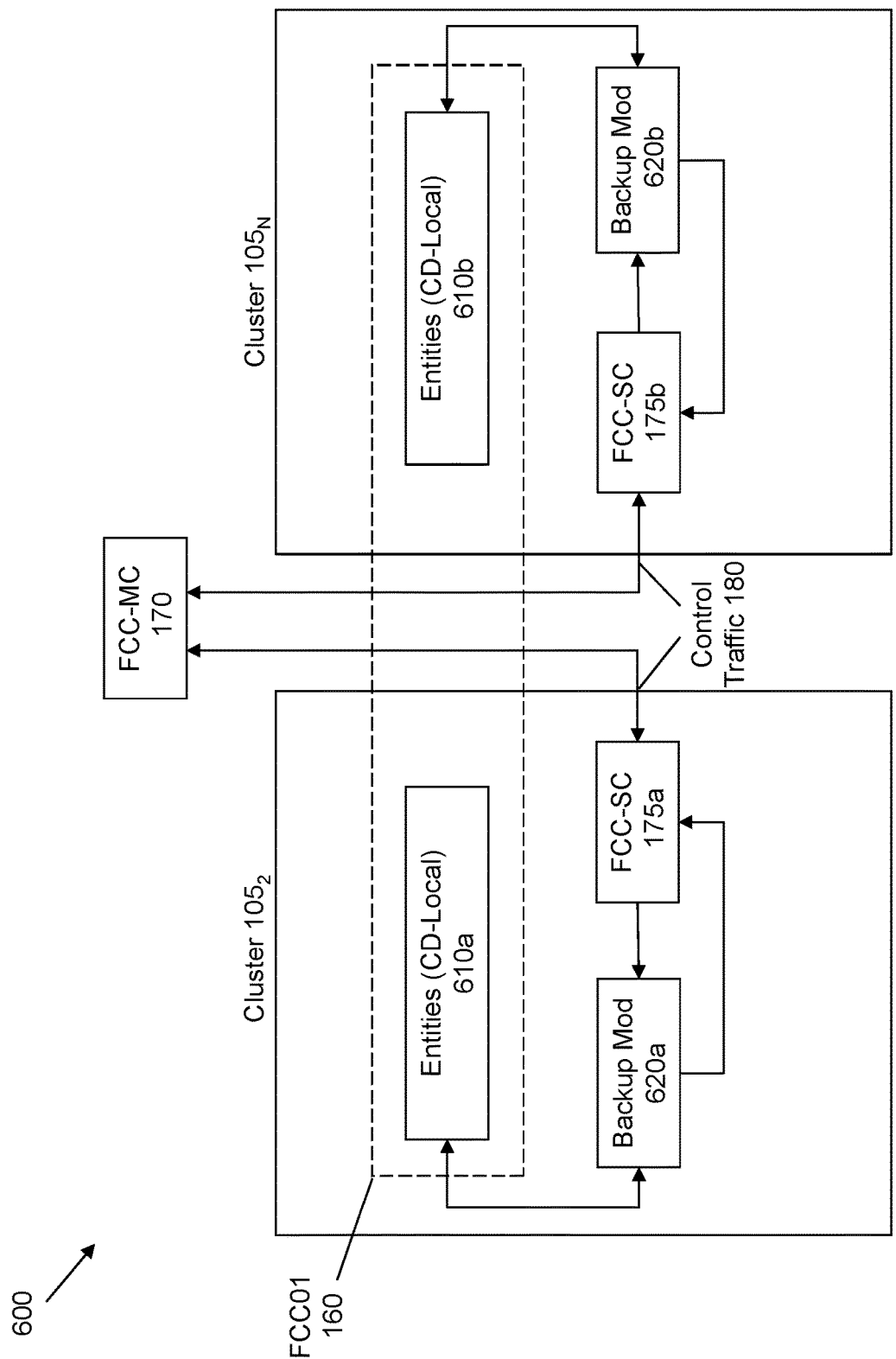
FIG. 6 illustrates an example architecture in which some embodiments of the disclosure are implemented.

FIG. 6 illustrates an example architecture in which some embodiments of the disclosure are implemented. In particular, system 600 illustrates an operational diagram of slave backup coordinators communicating with a master backup coordinator and backup module for implementing an application consistent snapshot for entities within its local cluster. System 600 comprises slave clusters $105_2$ and cluster $105_N$. Each cluster has entities 610, backup modules 620, and slave backup coordinators FCC-SC 175. FCC-MC 170 is depicted as a stand alone light weight process running outside of cluster $105_2$ and cluster $105_N$. In an alternate embodiment, FCC-MC 170, as discussed above, may execute outside of the clusters as a stand alone light weight process to coordinate the application consistent snapshot across the FCC01 160. In the present embodiment, FCC-MC 170 is executing within a CVM on cluster $105_1$ (not shown for simplicity of explanation).

Entities 610 include nodes within the cluster, virtual machines operating on the nodes, data shards associated to the virtual machines, caches associated to the shards and the virtual machines, non-sharded databases that are a member of the FCC01 160, etc. on respective local clusters. Entities 610 include objects that are of concern during (1) freezing of the VMs, caches and shards, (2) backing up of the shards via snapshots, and (3) thawing.

Backup modules 620 are the processing modules responsible for executing the control calls from the slave backup coordinators FCC-SC(s) 175. FCC-SC(s) 175 may instruct the backup modules 620 to "freeze", "create snapshot", and/or "thaw", etc. The backup modules 620 execute the control calls received from the FCC-SC(s) 175 to carry out the backup operations.

Therefore, what has been described is an improved method and product for generating application consistent snapshots of data shards distributed across a plurality of storage clusters. The aforementioned disclosure improves the technological area of data backup and in particular, application consistent snapshots of data shards using a distributed and federated protection domain model across two more storage clusters. The present disclosure solves the technical problem of being able to provide an application consistent snapshot of datasets stored on sharded databases that span across multiple servers within a cluster and multiple servers that span across multiple storage clusters. The present disclosure solves this technical problem by introducing a federated consistency coordination protection domain that includes a master backup coordinator that coordinates the freezing of all shards within the federated consistency coordination protection domain via slave backup coordinators to ensure all shards within the FCC-PD are frozen before snapshots are taken of the shards within the FCC-PD. Once all of the snapshots are successfully taken, the FCC-MC issues the thaw control call to resume operations of the VMs and data shards.

System Architecture

Additional System Architecture Examples

Figure 7A:
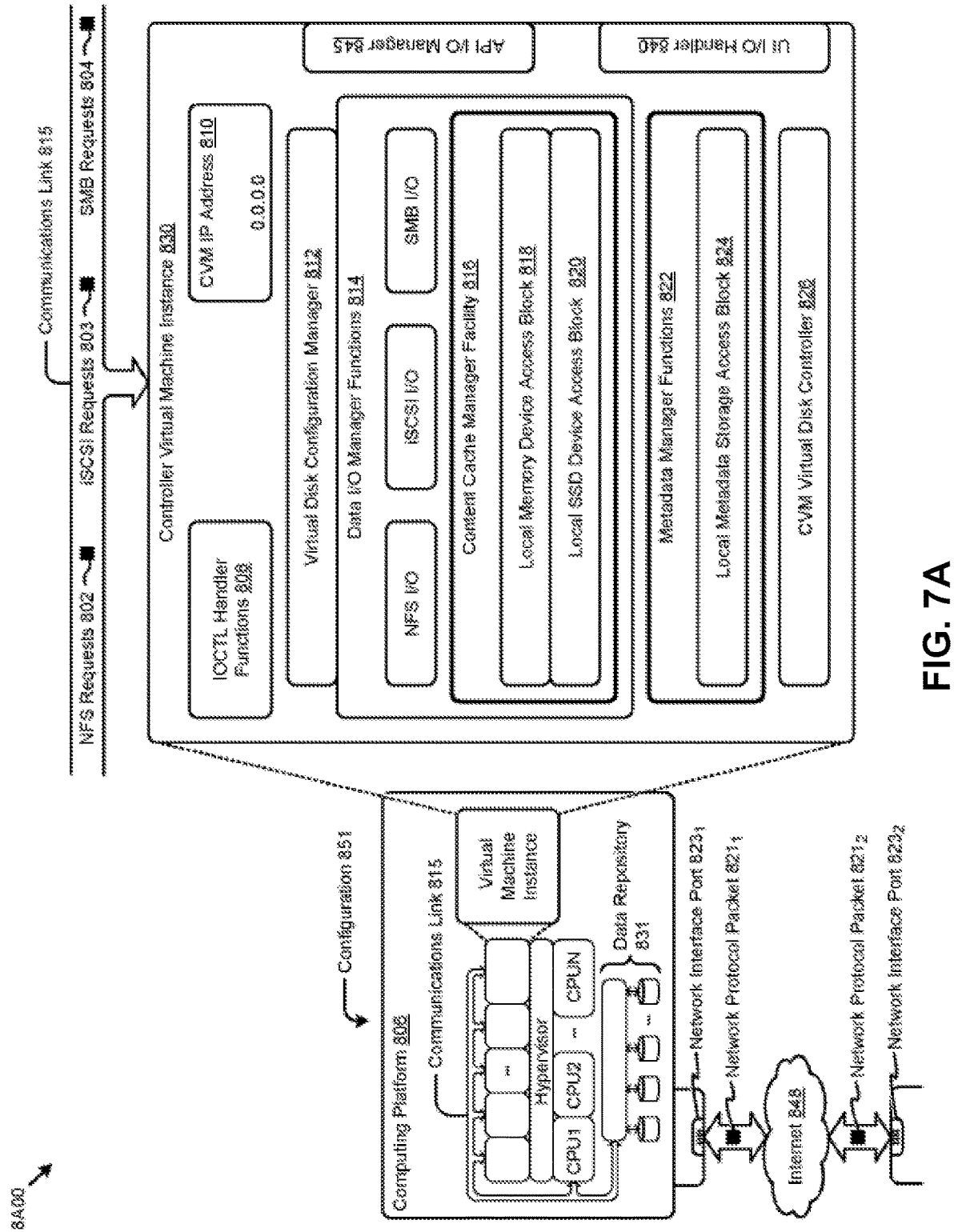
FIGS. 7A-7C depict virtualized controller architectures comprising collections of interconnected components suitable for implementing embodiments of the present disclosure and/or for use in the herein-described environments.

FIG. 7A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 8A00 comprises a collection of interconnected components suitable for implementing embodiments of the present disclosure and/or for use in the herein-described environments. Moreover, the shown virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 830 includes content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to multi-tiered metadata mapping in distributed computing environments. In some embodiments, a module may include one or more state machines and/or combinational logic used to implement or facilitate the operational and/or performance characteristics pertaining to multi-tiered metadata mapping in distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of multi-tiered metadata mapping in distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to multi-tiered metadata mapping in distributed computing environments, and/or for improving the way data is manipulated when performing computerized operations pertaining to implementing a multi-tiered metadata mapping regime comprising a metadata virtual disk that refers to a collocated data virtual disk.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
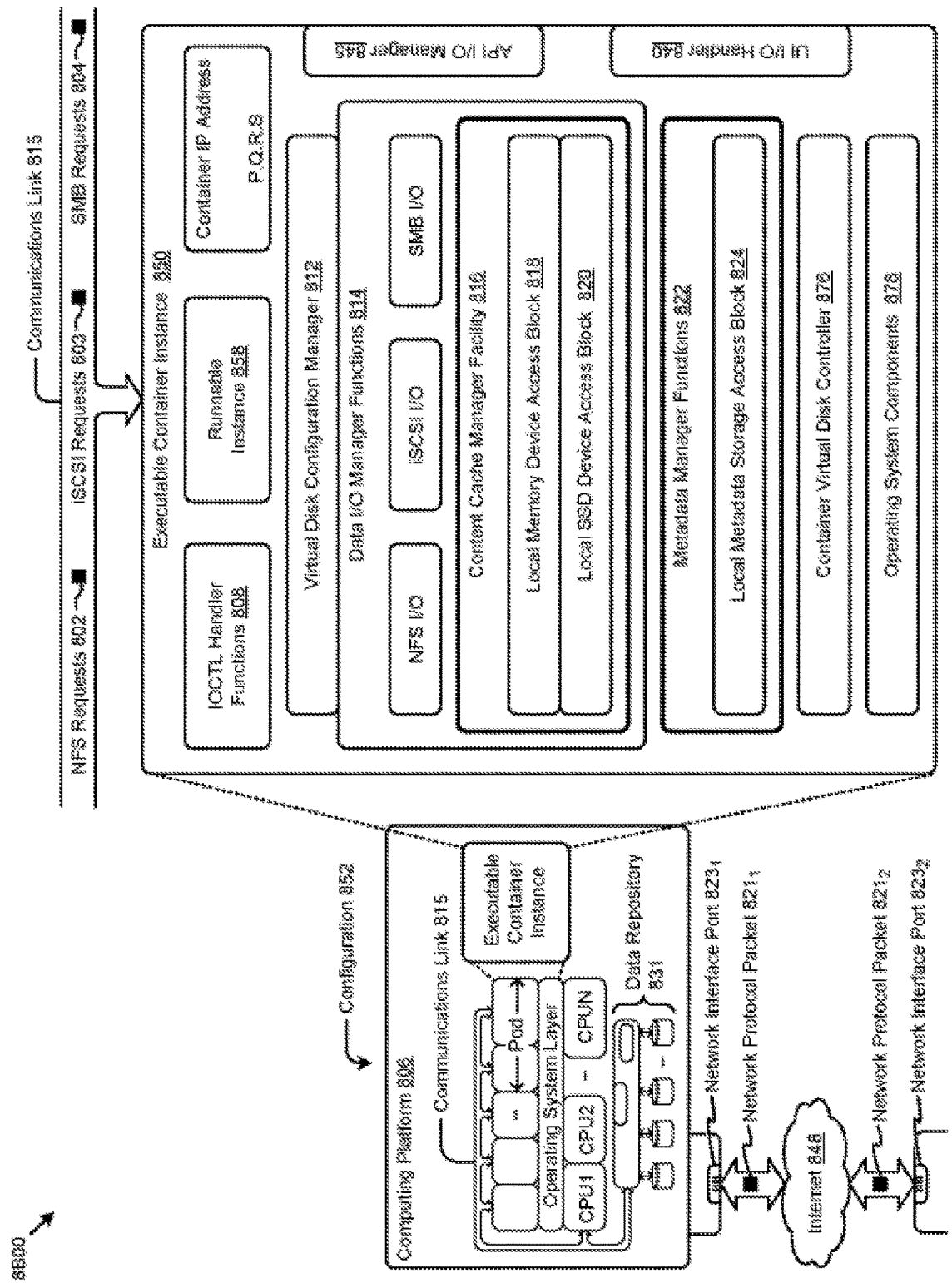

FIG. 7B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to the executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
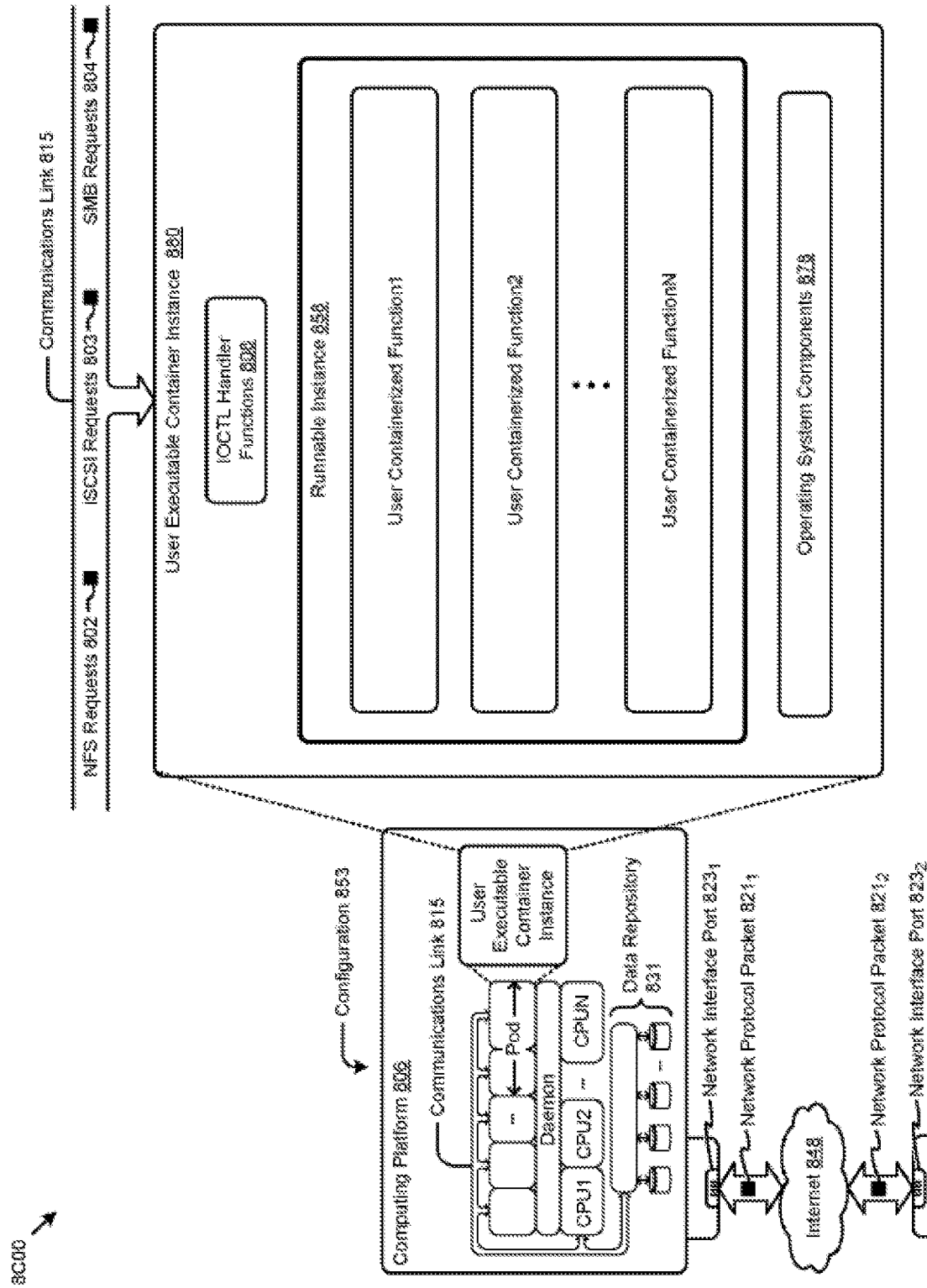

FIG. 7C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 7A and/or the containerized architecture 8B00 of FIG. 7B and/or the daemon-assisted containerized architecture 8C00 of FIG. 7C can be used in any combination to implement a distributed platform that contains multiple servers and/or nodes that manage multiple tiers of storage, where the tiers of storage might be formed using the shown data repository 831 and/or any forms of network accessible storage. As such, the multiple tiers of storage may include storage that is accessible over the communications link 815. Such network accessible storage may include cloud storage or networked storage (e.g., a SAN or "storage area network"). Unlike prior approaches, the herein-discussed embodiments of a storage pool include local storage that is within or directly attached to the server or node to be managed as part of a storage pool.

Such local storage can include any combinations of the aforementioned SSDs and/or HDDs and/or RAPMs and/or hybrid disk drives. In some cases, the local storage that is within or directly attached to the server or node is directly attached in that the node does not communicate over the communications link 815 when accessing local storage. In many cases, the local storage is local to the node because the storage devices that comprise the local storage are on the same motherboard that forms the node, or in the same chassis as the node, or in the same rack as the node, or in the same data center as the node. The node can still access certain network-attached storage over the communications link 815, which network-attached storage might be located in a different geography or located on the far side of a public switched network such as the Internet. The distributed metadata store as discussed herein often shards a key-value pair across many nodes organized into a ring. Each node hosts a one or more of the shards (e.g., an assigned shard as well as a shard from that node's previous ring-wise neighbor node and a shard from that node's next ring-wise neighbor node). Any of the nodes of the ring might be geographically collocated, or might be geographically distant from another node of the ring, or any combination of local neighbor nodes and/or distal neighbor nodes.

The address spaces of a plurality of storage devices, including both local storage (e.g., using at least one node-internal, locally-attached storage device) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual, since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments a vDisk is mountable. In some embodiments a vDisk is mounted as a virtual storage device.

In example embodiments, some or all of the servers or nodes run virtualization software. Such virtualization software might include a hypervisor (e.g., as shown in configuration 851 of FIG. 7A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster. The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 8:
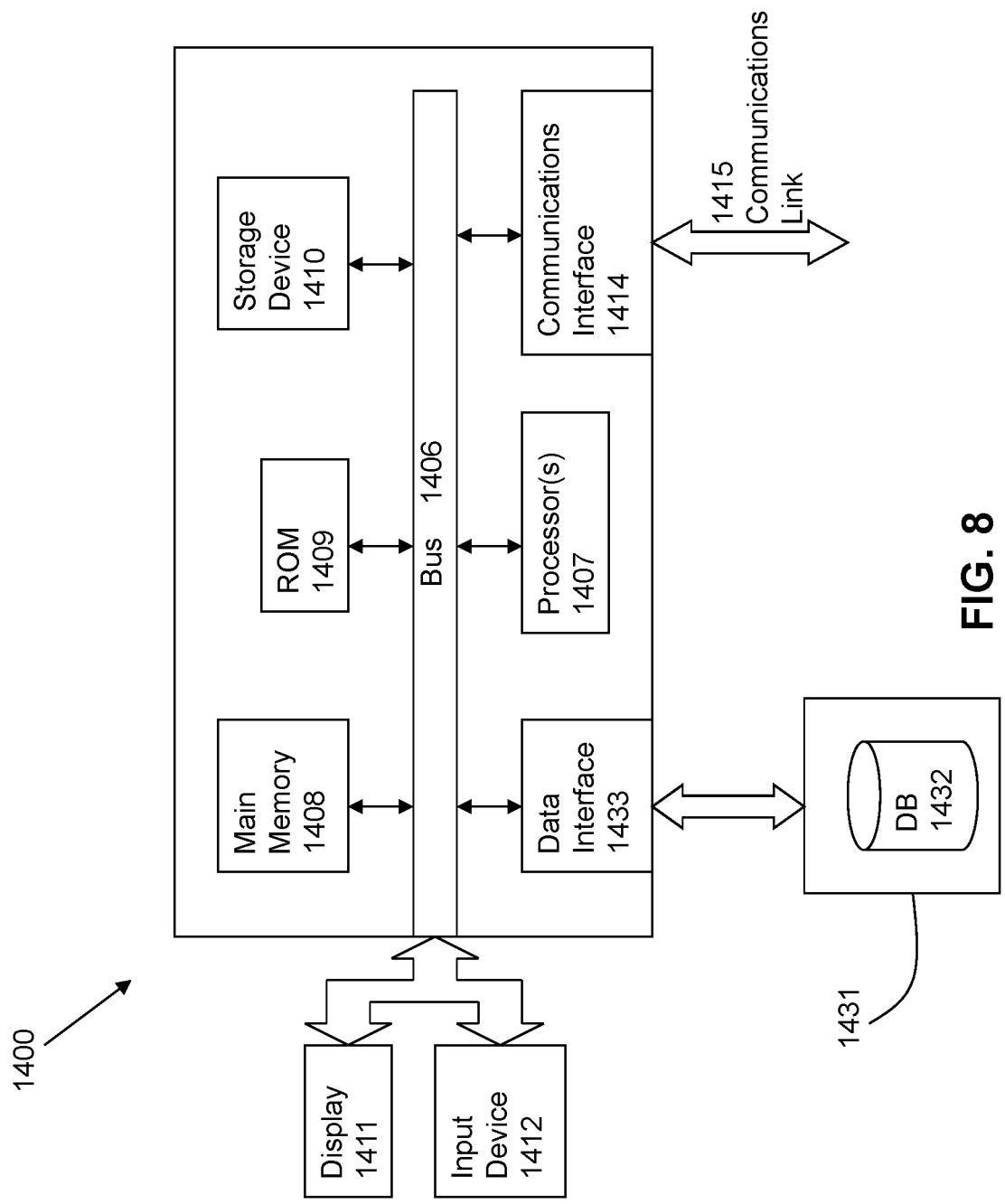
FIG. 8 is a block diagram of a computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for generating application consistent snapshots of data shards distributed across a plurality of storage clusters, the method comprising:
   forming a protection domain across a plurality of storage clusters, the protection domain defining at least a group of virtual machines to be backed up together, forming the protection domain comprising:
      a spanned protection domain that spans a plurality of storage clusters;
      a plurality of virtual machines to be backed up together within the spanned protection domain; and
      a data shard associated with the plurality of virtual machines, the data shard distributed across the plurality of storage clusters; and
   generating an application consistent snapshot where the plurality of virtual machines and the data shard is grouped and backed up together at least by:
      freezing the data shard distributed across the plurality of storage clusters, and
      initiating the generation of the application consistent snapshot in response to confirmation that the data shard distributed across the plurality of storage clusters is frozen.

2. The method of claim 1, wherein the protection domain is a group of one or more virtual machines that are backed up together, the group of one or more virtual machines executing across the plurality of storage clusters.

3. The method of claim 1, wherein generating the application consistent snapshot further comprises electing a master backup coordinator that coordinates the application consistent snapshot and issuing, by the master backup coordinator, a backup control call to slave backup coordinators in the protection domain.

4. The method of claim 3, wherein the master backup coordinator is part of a controller virtual machine.

5. The method of claim 3, wherein the master backup coordinator is a slave backup coordinator for its corresponding cluster.

6. The method of claim 3, further comprising issuing a thaw control call to the slave backup coordinator to unfreeze a data shard after the master backup coordinator receives confirmation of successful completion of the application consistent snapshot from the slave backup coordinator.

7. The method of claim 1, wherein generating the application consistent snapshot of the protection domain is for multi-array crash consistency.

8. The method of claim 1, wherein the application consistent snapshot is application consistent at a namespace level.

9. A system for generating application consistent snapshots of data shards distributed across a plurality of storage clusters, the system comprising:
   a memory having stored thereon a set of instructions; and
   a processor that executes the set of instructions to cause a set of acts comprising:
      forming a protection domain across a plurality of storage clusters, the protection domain defining at least a group of virtual machines to be backed up together, forming the protection domain comprising:
         a spanned protection domain that spans a plurality of storage clusters;
         a plurality of virtual machines to be backed up together within the spanned protection domain; and
         a data shard associated with the plurality of virtual machines, the data shard distributed across the plurality of storage clusters; and
      generating an application consistent snapshot where the plurality of virtual machines and the data shard is grouped and backed up together at least by:
         freezing the data shard distributed across the plurality of storage clusters, and
         initiating the generation of the application consistent snapshot in response to confirmation that the data shard distributed across the plurality of storage clusters is frozen.

10. The system of claim 9, wherein the protection domain is a group of one or more virtual machines that are backed up together, the group of one or more virtual machines executing across the plurality of storage clusters.

11. The system of claim 9, wherein generating the application consistent snapshot further comprises:
   electing a master backup coordinator that coordinates the application consistent snapshot and issuing, by the master backup coordinator, a backup control call to slave backup coordinators in the protection domain.

12. A non-transitory computer readable medium having stored thereon a sequence of instructions which, when executed by a processor causes a set of acts comprising:
   forming a protection domain across a plurality of storage clusters, the protection domain defining at least a group of virtual machines to be backed up together, forming the protection domain comprising:
      a spanned protection domain that spans a plurality of storage clusters;
      a plurality of virtual machines to be backed up together within the spanned protection domain; and
      a data shard associated with the plurality of virtual machines, the data shard distributed across the plurality of storage clusters; and
   generating an application consistent snapshot where the plurality of virtual machines and the data shard is grouped and backed up together at least by:
      freezing the data shard distributed across the plurality of storage clusters, and
      initiating the generation of the application consistent snapshot in response to confirmation that the data shard distributed across the plurality of storage clusters is frozen.

13. The non-transitory computer readable medium of claim 12, wherein the protection domain is a group of one or more virtual machines that are backed up together, the group of one or more virtual machines executing across the plurality of storage clusters.

14. The non-transitory computer readable medium of claim 12, wherein generating the application consistent snapshot further comprises electing a master backup coordinator that coordinates the application consistent snapshot and issuing, by the master backup coordinator, a backup control call to a slave backup coordinator in the protection domain.

15. The non-transitory computer readable medium of claim 14, wherein the process further comprises issuing a control call to perform a storage cluster level snapshot of a respective object for an entity with a local domain of the slave backup coordinator.

16. The non-transitory computer readable medium of claim 14, wherein the process further comprises issuing a thaw control call to the slave backup coordinator to unfreeze a data shard after the master backup coordinator receives confirmation of successful completion of the application consistent snapshot from the slave backup coordinator.

17. The non-transitory computer readable medium of claim 14, wherein the master backup coordinator is a slave backup coordinator for its corresponding cluster.

18. The non-transitory computer readable medium of claim 14, wherein when a shard within a local domain of the slave backup coordinator is frozen, the slave backup coordinator begins processing a snapshot of the shard that is frozen.

19. The non-transitory computer readable medium of claim 12, wherein generating the application consistent snapshot of the protection domain is for multi-array crash consistency.

20. The non-transitory computer readable medium of claim 12, wherein the application consistent snapshot is application consistent at a namespace level.

* * * * *